(12) United States Patent
Watanabe

(10) Patent No.: US 6,747,269 B2
(45) Date of Patent: Jun. 8, 2004

(54) SYSTEM FOR MEASURING OPTICAL PULSES HAVING AN OPTICAL SIGNAL DIVIDER WITH DELAY PROPAGATION

(75) Inventor: Satoshi Watanabe, Yokohama (JP)

(73) Assignee: Agilent Technologies, Inc., Palo Alto, CA (US)

( * ) Notice: Subject to any disclaimer, the term of this patent is extended or adjusted under 35 U.S.C. 154(b) by 123 days.

(21) Appl. No.: 10/217,320

(22) Filed: Aug. 12, 2002

(65) Prior Publication Data

US 2003/0034446 A1 Feb. 20, 2003

(30) Foreign Application Priority Data

Aug. 16, 2001 (JP) .................................. 2001-247199

(51) Int. Cl.⁷ .............................................. G01J 1/04
(52) U.S. Cl. ................................. 250/227.12; 398/183
(58) Field of Search ...................... 250/227.12, 227.11, 250/227.21, 201.1, 206; 398/183, 198, 189, 176, 180, 161

(56) References Cited

U.S. PATENT DOCUMENTS 4,053,763 A * 10/1977 Harney ....................... 250/206
5,719,623 A 2/1998 Kinoshita

FOREIGN PATENT DOCUMENTS

| JP | 2001013336 | 1/2001 |
| JP | 2001044938 | 2/2001 |

* cited by examiner

*Primary Examiner*—Que T. Le

(57) ABSTRACT

Systems and methods of measuring optical pulses are described. In one aspect, an optical pulse measurement system includes an optical signal divider and an optical signal conversion system. The optical signal divider has an optical input for receiving an input optical signal, multiple optical outputs, and a set of multiple optical channels. The optical channels are coupled between the optical input and respective optical outputs and are operable to delay propagation of optical signals, which are divided from the input optical signal, from the optical input to respective optical outputs by different respective amounts of time. The optical signal conversion system is coupled to the optical signal divider optical outputs and is operable to convert temporal intensity distributions of light received from the optical signal divider optical outputs into respective spatial intensity distributions in parallel.

25 Claims, 4 Drawing Sheets

SYSTEM FOR MEASURING OPTICAL PULSES HAVING AN OPTICAL SIGNAL DIVIDER WITH DELAY PROPAGATION

CROSS-REFERENCE TO RELATED APPLICATIONS

Under 35 U.S.C. § 119 this application claims the benefit of co-pending Japanese Patent Application No. 2001-247199, which was filed Aug. 16, 2001, and is incorporated herein by reference.

BACKGROUND

In many applications, such as optical measurement, optical communications, and optical storage, it often is desirable to measure the transient behaviors of optical signals. As improvements in optical technologies push optical data rates higher, however, there is a corresponding need for optical measurement systems that can accurately measure the resulting high speed optical data signals. Conventionally, the transient pulses of high speed optical signals may be measured by a variety of different optical measurement systems, including sampling optical oscilloscopes.

Referring to FIG. 1, in one exemplary implementation, a sampling optical oscilloscope 10 includes a lens 12 for focusing an input light signal, which may be received from, for example, an optical fiber 14. Sampling optical oscilloscope 10 also includes a sampling streak tube 16, which includes a photocathode 18, an acceleration electrode 20, a sweep electrode system 22, a slit plate 24, and a phosphor screen 26. Photocathode 18 converts incident light received from lens 12 into electrons, which are accelerated toward sweep electrode system 22 by acceleration electrode 20. Sweep electrode system 22 performs a high speed sweep (i.e., deflection of electrons along a particular direction) across slit plate 24, transforming time variations of the incident light intensity into spatial electron density variations at different positions on slit plate 24. Slit plate 24 includes a slit 28 that allows a sample of the swept electrons to reach phosphor screen 26, where the sampled electrons are converted into light that is detected by a photomultiplier tube 30.

Referring to FIG. 2, U.S. Pat. No. 5,719,623 discloses a multi-channel streak camera 32 that includes an optical lens 34 that converts a subject 36 into a subject image 38. A converter 40 converts the subject image 38 into a plurality of divided micro-incident electronic images 42, 44, 46 consisting of pixels that are separated by a predetermined spacing. The photoelectrons corresponding to the micro-incident electronic images 42–46 are passed through openings 48, 50, 52 of a focusing electron lens 54, which focuses each of the micro-incident electronic images 42–46. A sweep electrode system 56 sweeps each of the focused electron beams in a particular direction. The swept electron beams then are focused on an output plane 58. In this way, variations at different locations in the subject image 38 during the same periods of time may be detected as spatial variations in parallel. In addition, because the subject image is divided into a plurality of smaller micro-incident electronic images, the focusing electron lens 54 may be relatively short in length, reducing space-charge effect blurring.

SUMMARY

In one aspect of the invention, an optical pulse measurement system includes an optical signal divider and an optical signal conversion system. The optical signal divider has an optical input for receiving an input optical signal, multiple optical outputs, and a set of multiple optical channels. The optical channels are coupled between the optical input and respective optical outputs and are operable to delay propagation of optical signals, which are divided from the input optical signal, from the optical input to respective optical outputs by different respective amounts of time. The optical signal conversion system is coupled to the optical signal divider optical outputs and is operable to convert temporal intensity distributions of light that are received from the optical signal divider optical outputs into respective spatial intensity distributions in parallel.

In another aspect, the invention features an optical pulse measurement method. In accordance with this inventive method, optical signals are divided from an input optical signal. Propagation of the divided optical signals is delayed by a first set of different respective amounts of time. Temporal intensity distributions of the delayed optical signals are converted into respective spatial intensity distributions in parallel.

Among the advantages of the invention are the following.

Because the invention converts temporal intensity distributions of light that are received from multiple optical channels into respective spatial intensity distributions in parallel, the invention enables the time waveform of an input optical signal to be measured quickly. In addition, because the divided light signals that are transmitted through the multiple optical channels are delayed by different respective amounts of time, the invention enables the time waveform of high speed input optical signals to be measured with excellent temporal resolution.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
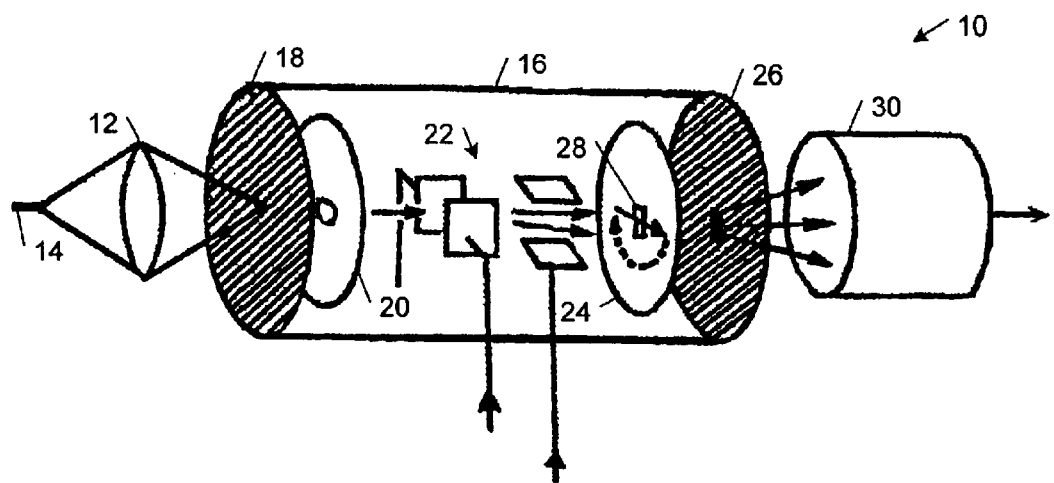
FIG. 1 is diagrammatic perspective view of a prior art sampling optical oscilloscope.
Figure 2:
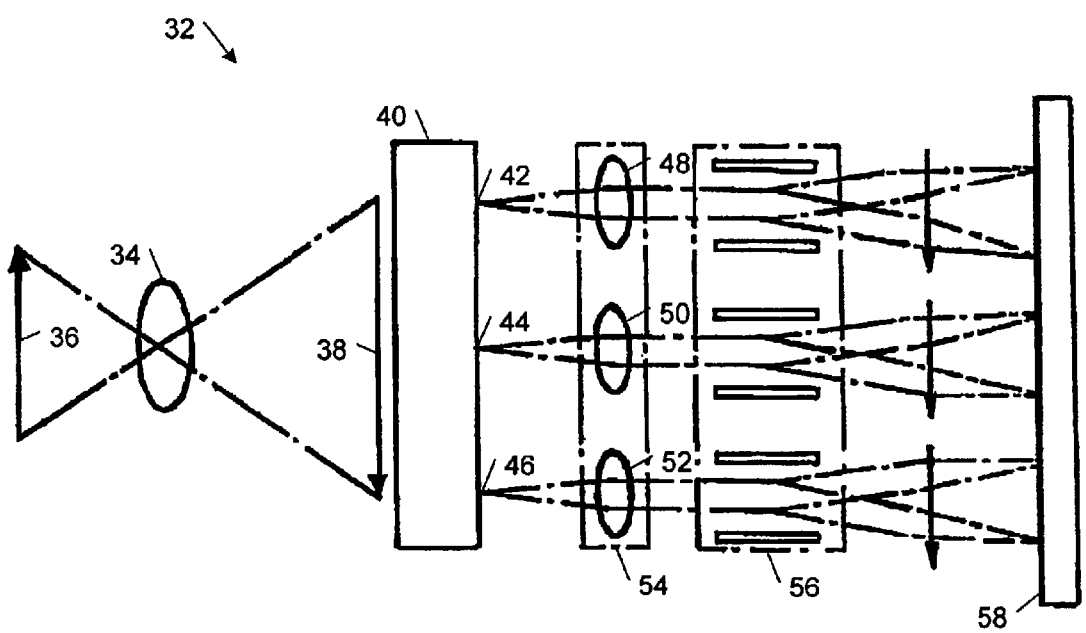
FIG. 2 is a diagrammatic view of a prior art multi-channel streak camera.
Figure 3:
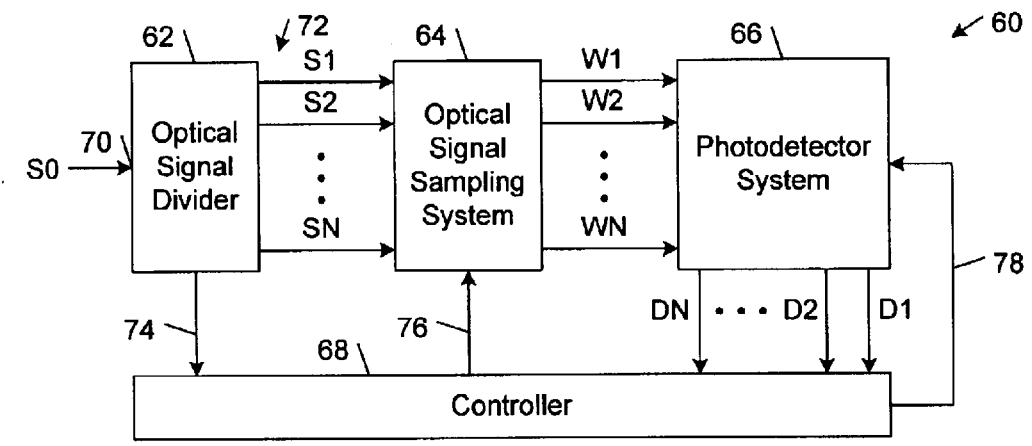
FIG. 3 is a block diagram of an optical pulse measurement system that includes an optical signal divider, an optical signal sampling system, a photodetector system, and a controller.

Referring to FIG. 3, in one embodiment, an optical pulse measurement system 60 includes an optical signal divider 62, an optical signal sampling system 64, a photodetector system 66, and a controller 68. As explained in detail below, optical signal divider 62 has an optical input 70 for receiving an input optical signal (S0) and multiple optical outputs 72. Optical signal divider 62 also includes a set of multiple (i.e., two or more) optical channels that are coupled between the optical input 70 and respective optical outputs 72 and are operable to delay propagation of optical signals, which are divided from the input optical signal S0, from the optical input 70 to respective optical outputs 72 by different respective amounts of time. The resulting divided optical signals S1, S2, . . . , SN that are output from the optical signal divider 62 are input into optical signal sampling system 64 where temporal intensity distributions of light received from each optical signal divider optical output are converted into respective spatial intensity distributions, which are sampled by a spatial distribution sampling system. In some embodiments, optical signal sampling system 64 may be implemented as a multi-channel streak tube, which subjects the divided optical signals S1, S2, . . . , SN to time/space conversion, sampling, and reconstruction. The resulting output light signals W1, W2, . . . , WN that are produced by optical signal sampling system 64 are input into photodetector system 66, which produces corresponding electrical signals D1, D2, . . . , DN. Controller 68 is operable to compute the waveform of the input optical signal S0 from the electrical signals D1, D2, . . . , DN that are received from the photodetector system 66. Controller 68 receives a reference signal 74 from optical signal divider 62. Based on the reference signal 74, controller 68 synchronizes and controls the operation of optical signal sampling system 64 and photodetector system 66 with respective control signals 76, 78.

Figure 4:
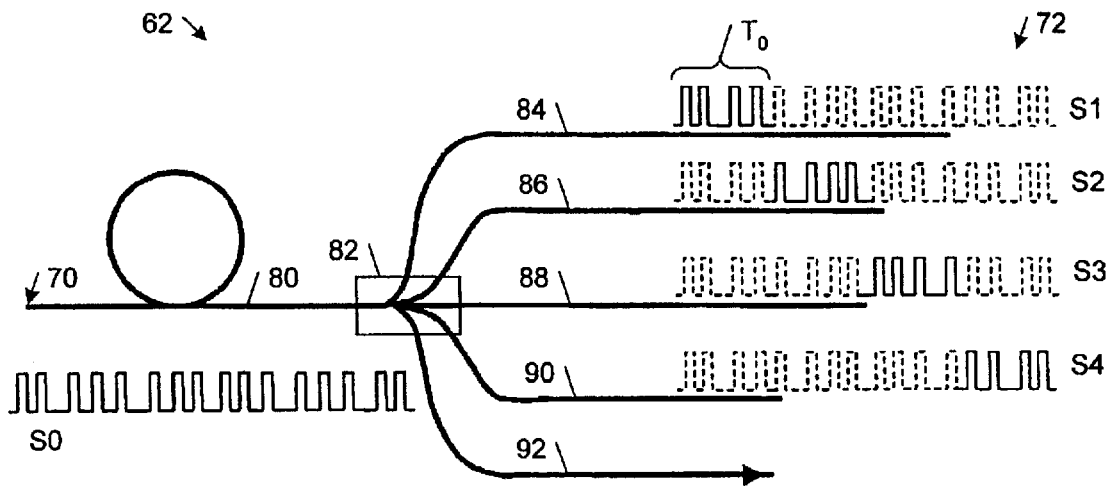
FIG. 4 is a diagrammatic view of an implementation of the optical signal divider of FIG. 3.

Referring to FIG. 4, in one embodiment, optical signal divider 62 includes an input optical waveguide 80 for receiving input optical signal S0, an optical multiplexer 82, and a set of multiple (i.e., two or more; four are shown in the illustrated embodiment) channel optical waveguides 84, 86, 88, 90 each defining a respective optical channel of the optical signal divider 62. The optical multiplexer 82 divides the input optical signal S0 received from input optical waveguide 80 into the multiple channel optical waveguides 84–90 and into a reference optical waveguide 92. Reference optical waveguide 92 transmits the signal 74 that is divided from the input optical signal SO to controller 68 for synchronizing the operation of optical pulse measurement system 60. Optical multiplexer 82 may be implemented as a conventional photocoupler and optical waveguides 84–92 may be implemented as fiber amplifiers.

As shown in FIG. 4, each of the channel optical waveguides 84–90 has a different length so that the set of channel optical waveguides 84–90 is operable to delay propagation of optical signals from the optical input 70 to respective optical outputs 72 by different respective amounts of time. Although other options are possible, in the illustrated embodiment the channel optical waveguides 84–90 are structured such that the delay successively decreases in equal amounts, which corresponds to the sampling period ($T_0$) for each channel.

Figure 5:
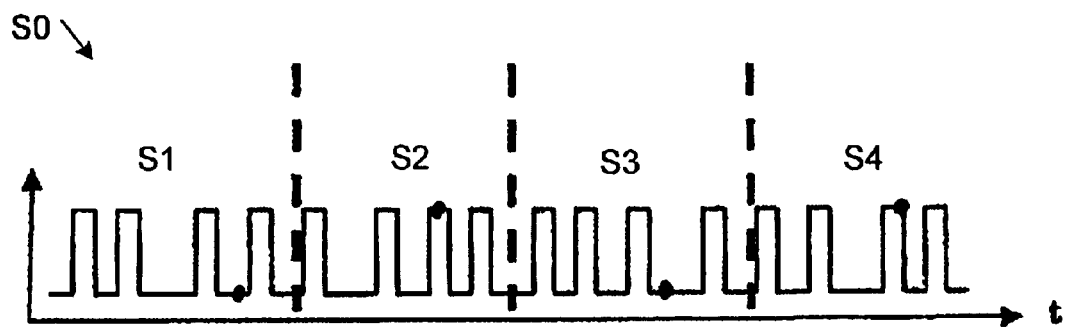
FIG. 5 is a graph of an input optical signal plotted as a function of time.
Figure 6:
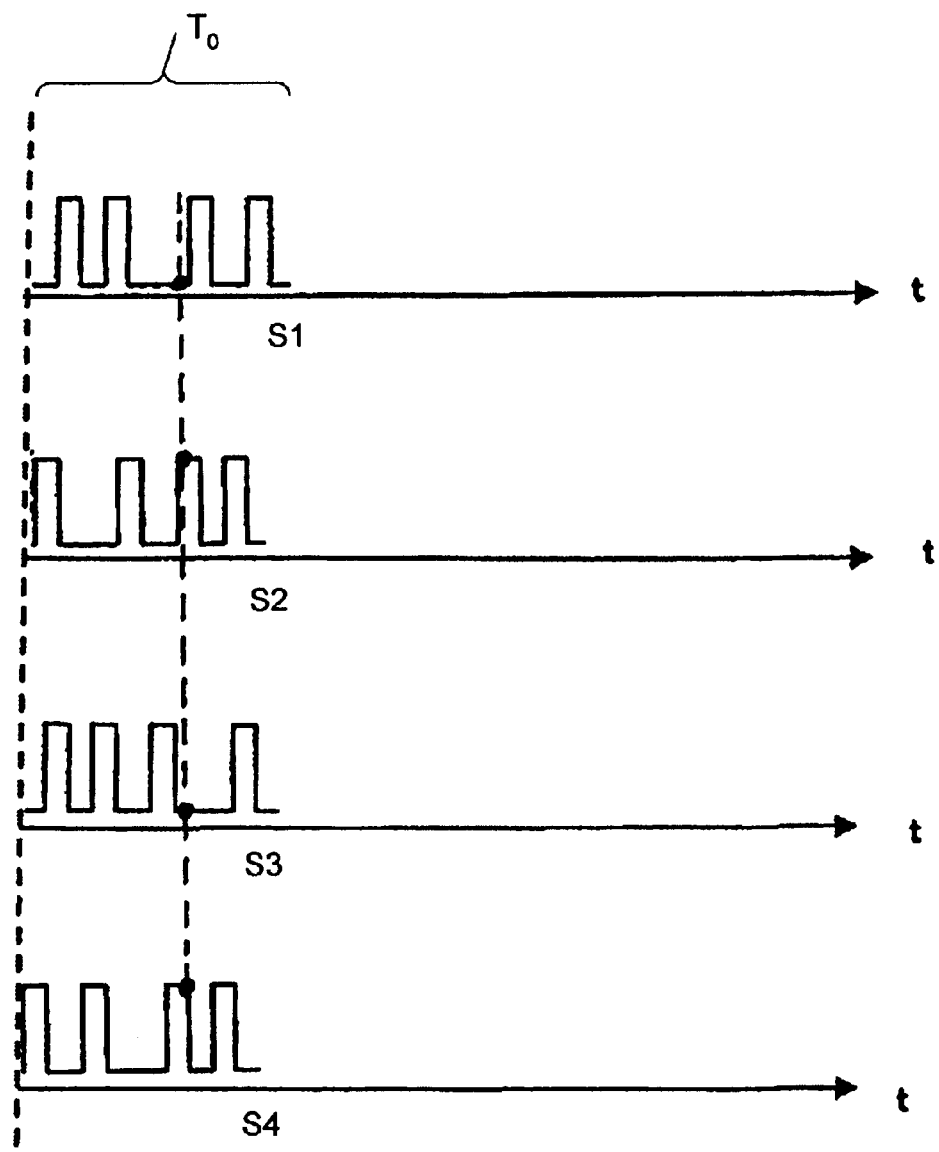
FIG. 6 illustrates graphs of different portions of the input optical signal of FIG. 6 that are output from the optical signal divider of FIG. 4 in parallel.

Referring to FIGS. 5 and 6, in the illustrated embodiment, the divided optical signals S1, S2, S3, S4 that are output from the channel optical waveguides 84–90 are sampled simultaneously in the various time periods of the divided optical signals S1, S2, S3, S4. Even if signal processing is not completed within each sampling period, it is possible to sample another optical signal in another channel, as indicated by the black dots, so that different time periods of the input optical signal S0 may be sampled at the same time. In general, since parallel processing may be performed for N channels, the equivalent sampling rate (or density) may be increased N-fold. For example, if the divided optical signals S1, S2, . . . , SN are delayed as D, D+$T_0$, . . . , D+(N−1) $T_0$, respectively, then the period of the divided optical signals may be treated as if it were $T_0$. The sampling period $T_0$ may be selected to achieve a desired temporal resolution.

Figure 7:
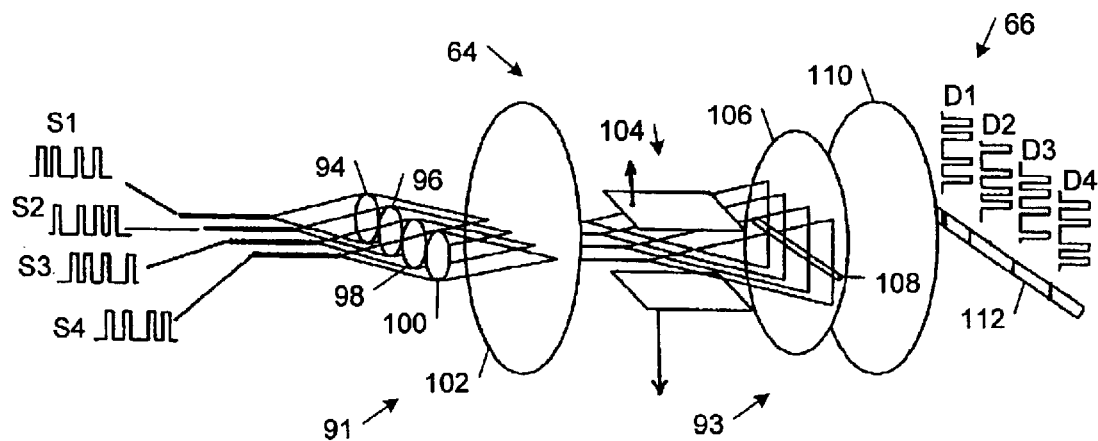
FIG. 7 is a diagrammatic view of an output portion of the optical signal divider of FIG. 4 and an implementation of the optical signal sampling system of FIG. 4.

Referring to FIG. 7, optical signal sampling system 64 includes an optical signal conversion system 91 and a spatial electron density distribution sampling system 93. The divided optical signals S1, S2, S3, S4 that are output from channel optical waveguides 84–90 are focused by respective optical lenses 94, 96, 98, 100 onto a multi-channel photocathode 102 of optical signal conversion system 91. In the illustrated embodiment, the divided optical signals S1, S2, S3, S4 are focused onto multi-channel photocathode 102 in a straight line that is oriented in a first direction. Multi-channel photocathode 102 generates photoelectrons from the received divided optical signals S1, S2, S3, S4. The photoelectrons are accelerated toward an acceleration electrode (not shown) and are deflected in a second direction, which is perpendicular to the first direction, by a deflecting electrode pair 104. In this embodiment, the spatial electron density distribution sampling system 93 is implemented by a slit plate 106, which includes a slit 108 that is oriented along the first direction, and a phosphor screen 110. The deflected photoelectrons are swept across a slit plate 106 to create a spatial photoelectron density distribution. The swept photoelectrons are sampled by passing through slit 108. Phosphor screen 110 converts the sampled photoelectrons into light signals that are directed to a respective photodetector 112 (e.g., a photodiode) of photodetector system 66. In the illustrated embodiment, Photodetector system 66 includes a respective photodetector for each optical channel. The photodetectors preferably are arranged in a line that is oriented along the first direction. The photodetectors generate electrical output signals D1, D2, D3, D4, which then are transmitted to controller 68 for processing. An optional microchannel plate (not shown) may be provided between the phosphor screen 110 and the slit plate 106 to increase detection sensitivity.

In operation, controller 68 applies a voltage to the deflecting electrode pair 104 that produces a graded electric field between the deflecting electrodes. The voltage is applied by controller 68 so that the photoelectrons of all channels are driven at the same time and swept across the slit plate 106 simultaneously. The deflection voltage varies over each sampling period (or cycle) and may include a portion that rises or falls linearly, and a portion involving a return from this rise or fall. In some embodiments, the rise or fall portion and the retrace portion are the same except for being in opposite directions, and the sampling may be performed twice in one cycle. In one exemplary embodiment, the applied deflection voltage is a triangular wave. In other embodiments, the rise or fall portion is different from the retrace portion. In these embodiments, sampling is not performed in the retrace portion and, therefore, sampling is performed only once per cycle. In this way, the sampling time precision may be maintained at a high level. In other embodiments, the electrical output signals D1, D2, D3, D4 are ignored during the retrace period.

Noise in the electrical output signals D1, D2, D3, D4 may be reduced by sampling a plurality of divided signals at the same time and averaging the corresponding results.

Controller 68 synchronizes an internal clock based on the reference signal that is received from reference optical waveguide 92. Controller 68 synchronizes the deflection voltage with the internal clock. The deflection voltage also is adjusted so that signals are sampled for a specific length of time that is determined by the internal clock. Because the sampling time of the electrical output signals D1, D2, . . . , DN is known from the internal clock, the pulse waveform of the input optical signal S0 may be determined using conventional sampling optical oscilloscope signal processing techniques.

Optical pulse measurement system 60 may be used to measure the time waveform of an optical pulse (e.g., an optical pulse that is continuously oscillated at a few nanoseconds or the time waveform of the impulse response of an element under test) at high speed and at a high temporal resolution (e.g., 1 picosecond or less from an optical pulse with a width of 1 picosecond or less). In one exemplary implementation, phosphor screen 110 has a sweep width of 10 centimeters, the width of slit 108 in the second direction is 10 micrometers, and the sweep time is 1 nanosecond. With these parameters, the unit sweep time is 10 nanoseconds and the resulting temporal resolution is 1 picosecond. In this implementation, the sampling period To preferably is set to 1 nanosecond.

Other embodiments are within the scope of the claims.

Figure 8:
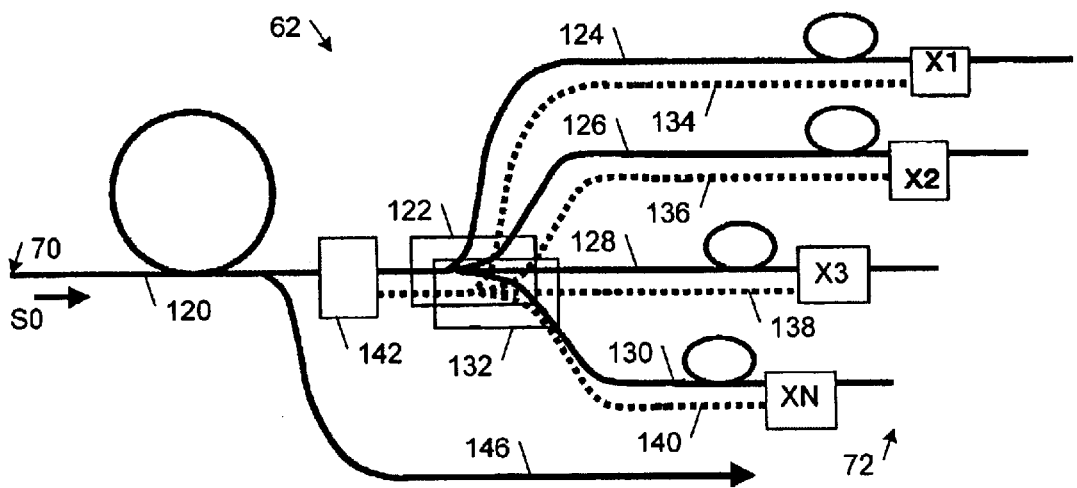
FIG. 8 is a diagrammatic view of another implementation of the optical signal divider of FIG. 3.

Referring to FIG. 8, another implementation of optical signal divider 62 includes an input optical waveguide 120 for receiving an input optical signal S0, a first optical multiplexer 122, and a first set of multiple (i.e., two or more; four are shown in the illustrated embodiment) channel optical waveguides 124, 126, 128, 130 each defining a respective optical channel of the optical signal divider 62. The optical multiplexer 122 divides the input optical signal S0 that is received from input optical waveguide 120 into the multiple channel optical waveguides 124–130. Optical multiplexer 122 may be implemented as a conventional photocoupler and optical waveguides 124–130 may be implemented as fiber amplifiers. Each of the channel optical waveguides 124–130 has a different length so that the set of channel optical waveguides 124–130 is operable to delay propagation of optical signals from the optical input 70 to respective optical outputs 72 by different respective amounts of time. Although other options are possible, in the illustrated embodiment the channel optical waveguides 124–130 are structured such that the delay successively decreases in equal amounts, which corresponds to a first sampling period ($T_0$) for each channel.

Optical signal divider 62 also includes a second optical multiplexer 132 and a second set of multiple (i.e., two or more; four are shown in the illustrated embodiment) channel optical waveguides 134, 136, 138, 140 each defining a respective optical channel of the optical signal divider 62. The optical multiplexer 132 divides the input optical signal S0 that is received from input optical waveguide 120 into the multiple channel optical waveguides 134–140. Optical multiplexer 132 may be implemented as a conventional photocoupler and optical waveguides 134–140 may be implemented as fiber amplifiers. Each of the channel optical waveguides 134–140 has a different length so that the set of channel optical waveguides 134–140 is operable to delay propagation of optical signals from the optical input 70 to respective optical outputs 72 by different respective amounts of time. In the illustrated embodiment the channel optical waveguides 134–140 are structured such that the delay successively decreases in equal amounts, which corresponds to a second sampling period ($T_1$) for each channel. In other embodiments, two or more of the channel optical waveguides 134–140 may have substantially identical lengths so as to provide substantially identical propagation delay times.

In the illustrated embodiment, the first sampling period ($T_0$) is different from the second sampling period ($T_1$). In this embodiment, the set of optical channels providing the longer delay time (i.e., channel optical waveguides 124–130) may be used to handle relatively slowly varying optical signals, and the set of optical channels (i.e., channel optical waveguides 134–140) providing the shorter delay time may be used to handle optical signals with relatively fast variations.

A transmission optical switch 142 directs input optical signal S0 to one of either the first or second sets of channel optical waveguides 124–30, 134–140. A set of four reception optical switches X1, X2, X3, X4 determines whether the optical signals in either the first set of channel optical waveguides 124–130 or the second set of channel optical waveguides 134–140 are passed to the optical outputs 72 of optical signal divider 62.

A reference optical waveguide 146 may be used to transmit a signal divided from the input optical signal S0 to controller 68 for synchronizing the operation of optical pulse measurement system 60.

Still other embodiments are within the scope of the claims.

For example, in some embodiments, optical signal sampling system 64 may include a second deflecting electrode pair that is configured to simultaneously deflect photoelectrons for all channels in a direction perpendicular to the deflection direction of the first deflecting electrode pair 104. In one of these embodiments, the second deflecting electrode pair may be disposed on the input side nearer to the phosphor screen 110 than the first deflecting electrode pair 104, resulting in a more compact structure. The different channels may be separated by separation zones at one or more of the slit 108, the array photodetector 112, and the phosphor screen 112 so as to reduce noise that might be generated during the retrace period. In these embodiments, the photoelectron sweeps during retrace periods may be moved to separation zones adjacent to the photoelectron sweep zones during the rise or fall periods. In some of these embodiments, the light signals W1, W2, . . . , WN that are output from the optical signal sampling system 64 may be detected, for example, at every other detection element of array photodetector 112 during the rise or fall period, and the output light signals W1, W2, . . . , WN may be detected by corresponding adjacent detection elements during the retrace period.

Also, in some embodiments, the electrical output signals D1, D2, D3, D4 may be ignored during the retrace period so as to further reduce noise that might be generated during the retrace period.

In another embodiment, the optical divider 62 may include an optical wavelength multiplexer/demultiplexer so that the optical pulse measurement system may be used to measure wavelength division multiplexed (WDM) optical signals. In this embodiment, the an optical wavelength multiplexer/demultiplexer may be implemented as a conventional optical wavelength multiplexer/demultiplexers (e.g., the an optical wavelength multiplexer/demultiplexer disclosed in Japanese Laid-Open Patent Application 2001-13336, which is incorporated herein by reference). In this embodiment, the various wavelength components of a WDM input optical signal may be sampled simultaneously, allowing the signal waveforms for all wavelengths to be measured in parallel. In this way, the measurement time may be shortened significantly.

In some embodiments, the relative positions of the phosphor screen 110 and the slit plate 106 may be interchanged. In these embodiments, the deflecting electrode pair 104 sweeps the photoelectrons across the phosphor screen 110. The corresponding light signals generated by phosphor screen 110 may be sampled by the slit 108 of slit plate 106.

What is claimed is:

1. An optical pulse measurement system, comprising:
   an optical signal divider having an optical input for receiving an input optical signal, multiple optical outputs, and a set of multiple optical channels coupled between the optical input and respective optical outputs and operable to delay propagation of optical signals divided from the input optical signal from the optical input to respective optical outputs by different respective amounts of time; and
   an optical signal conversion system coupled to the optical signal divider optical outputs and operable to convert temporal intensity distributions of light received from the optical signal divider optical outputs into respective spatial intensity distributions in parallel.

2. The system of claim 1, wherein the multiple optical channels are defined by respective optical waveguides having different respective lengths.

3. The system of claim 1, wherein the optical divider further comprises an optical multiplexer coupled between the optical input and the multiple optical channels and operable to divide an input optical signal into the multiple optical channels.

4. The system of claim 1, wherein the optical divider further comprises a wavelength division multiplexer coupled between the optical input and the multiple optical channels.

5. The system of claim 1, further comprising a spatial sampling system operable to sample the spatial intensity distributions received from the optical signal conversion system in parallel.

6. The system of claim 5, wherein the optical signal conversion system is operable to convert temporal intensity distributions of light received from the optical signal divider optical outputs into respective spatial electron density distributions in parallel, and the spatial sampling system is operable to sample the spatial electron density distributions.

7. The system of claim 1, further comprising a second set of multiple optical channels coupled between the optical input and respective optical outputs and operable to delay propagation of optical signals from the optical input to respective optical outputs by different respective amounts of time.

8. The system of claim 7, wherein the set of propagation delays provided by the first set of multiple optical channels is different from the set of propagation delays provided by the second set of multiple optical channels.

9. The system of claim 7, further comprising a transmission optical switch coupled between the optical input and the first and second sets of multiple optical channels and operable to direct an input optical signal to one of the first and second sets of multiple optical channels.

10. The system of claim 9, further comprising multiple reception optical switches each coupled to a respective one of the first set of multiple optical channels and a respective one of the second set of multiple optical channels and operable to direct optical signals received from an optical channel of the first set or from an optical channel of the second set to a respective optical output.

11. The system of claim 1, wherein the optical signal sampling system comprises a multi-channel photocathode having a plurality of channels arranged in a first direction and operable to convert optical signals received from the multiple outputs of the optical signal divider into photoelectrons in parallel.

12. The system of claim 11, wherein the optical signal sampling system further comprises a first deflecting electrode system for collectively deflecting in a second direction photoelectrons generated by the multi-channel photocathode.

13. The system of claim 12, further comprising a controller operable to apply to the deflecting electrode system a deflection voltage in cycles each having a deflection period and a retrace period and to disregard spatial intensity distributions generated during retrace periods.

14. The system of claim 12, wherein the optical signal sampling system further comprises a second deflecting electrode system for deflecting in the first direction photoelectrons generated by the multi-channel photocathode.

15. The system of claim 14, further comprising a controller operable to apply to the first deflection electrode system a deflection voltage in sweep cycles each having a deflection period and a retrace period and to apply to the second deflection electrode system a separation zone voltage for displacing spatially converted photoelectrons generated during deflection periods from spatially converted photoelectrons generated during retrace periods.

16. The system of claim 12, wherein the optical signal sampling system further comprises a slit plate having slits extending in the first direction and operable to pass photoelectrons deflected by the first deflecting electrode pair through the slits.

17. The system of claim 16, further comprising a phosphor screen operable to convert photoelectrons passing through the slits of the slit plate into output light.

18. The system of claim 17, further comprising an array photodetector operable to convert output light received from the phosphor screen into output electrical signals.

19. The system of claim 1, further comprising an optical channel providing an optical signal propagation delay that is substantially identical to propagation delay provided by one of the multiple optical channels.

20. An optical pulse measurement method, comprising:
   dividing optical signals from an input optical signal;
   delaying propagation of the divided optical signals by a first set of different respective amounts of time; and
   converting temporal intensity distributions of the delayed optical signals into respective spatial intensity distributions in parallel.

21. The method of claim 20, further comprising sampling the spatial intensity distributions in parallel.

22. The method of claim 21, wherein sampling comprises sweeping the spatial intensity distributions across a spatial sampling system.

23. The method of claim 20, further comprising selectively delaying propagation of the divided optical signals by a second set of different respective amounts of time.

24. The method of claim 23, wherein the first set of different respective amounts of time is different from the second set of different respective amounts of time.

25. The method of claim 20, wherein the temporal intensity distributions of light are converted into respective spatial electron density distributions.

* * * * *